(No Model.)
F. HORST.
AGRICULTURAL IMPLEMENT.
No. 301,597. Patented July 8, 1884.
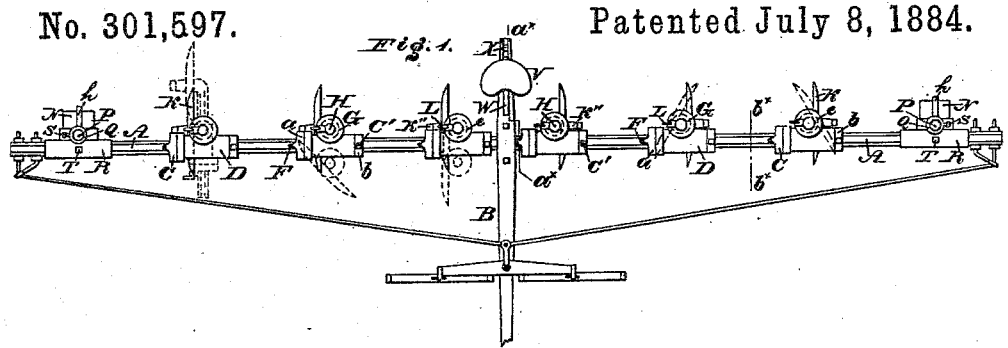
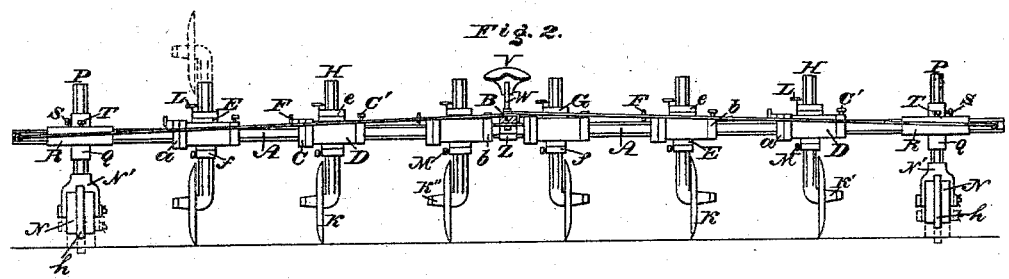
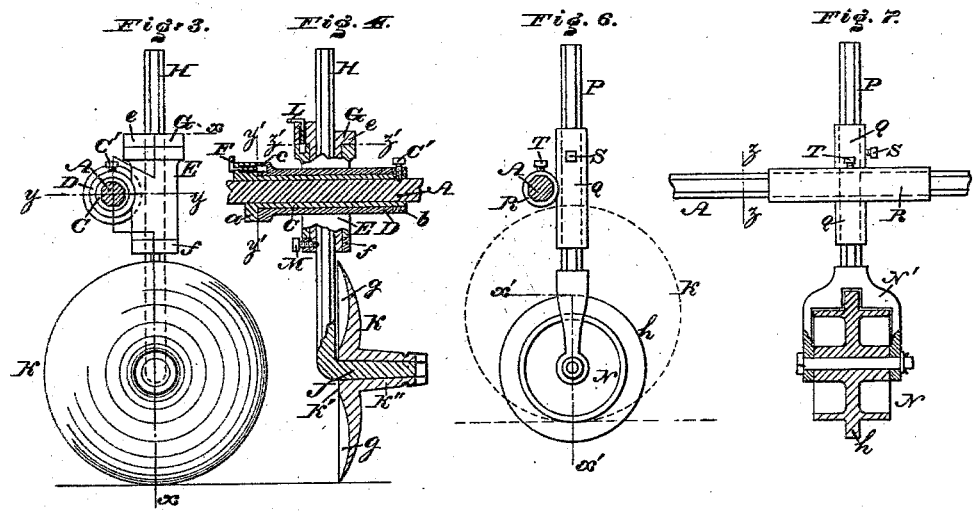
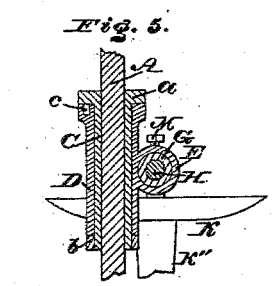
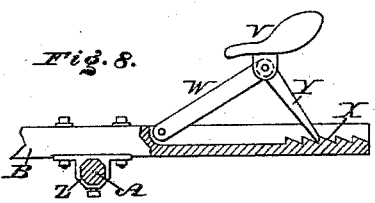
WITNESSES:
L. Douville
W. F. Kircher
INVENTOR:
Franklin Horst,
BY John A. Wiedersheim
ATTORNEY.

UNITED STATES PATENT OFFICE.

FRANKLIN HORST, OF MOORESTOWN, NEW JERSEY.

AGRICULTURAL IMPLEMENT.

SPECIFICATION forming part of Letters Patent No. 301,597, dated July 8, 1884.

Application filed November 22, 1883. (No model.)

*To all whom it may concern:*

Be it known that I, FRANKLIN HORST, a citizen of the United States, residing at Moorestown, in the county of Burlington, State of New Jersey, have invented a new and useful Improvement in Agricultural Implements, which improvement is fully set forth in the following specification and accompanying drawings, in which—

Figure 1 is a top or plan view of an agricultural implement embodying my invention. Fig. 2 is a front view thereof. The remaining eight views are views of detached parts enlarged, Fig. 4 being a section in line $x\,x$, Fig. 3; Fig. 5, a section in line $y\,y$, Fig. 3; Fig. 6, a section in line $z\,z$, Fig. 7; Fig. 7, a section in line $x'\,x'$, Fig. 6; Fig. 9, a section in line $y'\,y'$, Fig. 4; and Fig. 10 a section in line $z'\,z'$, Fig. 4, Fig. 3 being a section in line $b^\times\,b^\times$, Fig. 1. Fig. 8 is a view of the portion in line $a^\times\,a^\times$, Fig. 1, enlarged.

Similar letters of reference indicate corresponding parts in the several figures.

My invention consists of an agricultural implement, which is convertible into a plow, planter, coverer, cultivator, &c., as will be hereinafter fully set forth.

Referring to the drawings, A represents a horizontally-extending beam, to which the draft tongue or pole B is attached, said beam being of angular form or many-sided in cross-section, the same being triangular, square, hexagonal, &c., as desired. On the beam are fitted a series of sleeves, C, the inner faces whereof conform to the angular contour of the beam, and the outer faces are rounded or cylindrical; and freely encircling said sleeves C are sleeves D, with each of which is connected a vertical socket, E, it being noticed that each sleeve C has at one end a flange or head, $a$, and at the other end a collar, $b$, between which flange and collar the sleeve D is fitted. The end of the sleeve D, contiguous to the flange $a$, has a series of openings, $c$, arranged in curvilinear direction adapted for the engagement of a spring-bolt or fastening-pin, F, which is fitted in the flange or head $a$ of the sleeve C, whereby provision is made for adjustably rotating the sleeve D on the sleeve C. The sleeve C may be shifted laterally on the beam A, and when set where required is secured by a screw, C', which, it will be seen, passes through the collar $b$ and sleeve C, thus holding said collar in position and tightens on the beam. The socket E has within it a sleeve, G, the inner face whereof is of angular form, or many-sided in cross-section, the same being triangular, square, hexagonal, &c., as desired, to conform to the contour of a shaft or bar, H, which, fitted within the sleeve G, has its lower end formed with or secured to a journal, J, on which is mounted a disk, K, it being noticed that the sleeve G has at one end a flange or head, $e$, and at the other end a collar, $f$, between which flange and collar the socket E is fitted. The end of the socket E contiguous to the flange $e$ has a series of openings, $e'$, arranged in curvilinear direction, adapted for the engagement of a spring-bolt or fastening-pin, L, which is fitted in the flange $e$ of the sleeve G, whereby provision is made for adjustably rotating the socket E on the sleeve G. The bar H may be raised and lowered in the sleeve G for the vertical adjustment of the disk K, and when said bar is in proper position it is secured by a screw, M, which, it will be seen, passes through the collar $f$ and sleeve G, thus holding said collar in position, and tightens on the bar H. The disk K is of dishing form, raised at the center of the inner face, as at K', and the hub is lengthened, as at K'', forming an enlarged bearing for the disk K on the journal J. It will be seen that the curvature of the disk is from the outer edge of said disk to the central raised portion, K', forming two depressions, $g$, in the cross-sections of the disk, whereby, as said disk is to penetrate the ground, it accomplishes its work with greater facility and less draft, and possesses more strength than where the disk has its depression of an unbroken curvature from end to end of the disk.

To the ends of the beam A are attached marking and supporting wheels N, each having broad faces, and at the center thereof a projecting rib or flange, $h$, the bearing frame or arms of said wheel being attached to a vertical bar, P, which is adjustably fitted in a socket, Q, with which is connected a boss, R, through which the beam A is passed, it being seen that the contiguous faces of the bar P and socket Q are of angular form, thus preventing rotation of the bar within the socket, without, however, preventing vertical adjustment of said bar and consequently of the wheel N, the socket having a screw, S, for holding the bar in its adjusted position. The inner face of the boss R accords with the angular form of the beam A, thus preventing rotation of the boss on the beam, without, however, interfering with the lateral adjustment of the boss, so that the wheel may be set nearer to or farther from the ends of the beam, the boss having a screw, T, for holding it in its adjusted position.

V represents the driver's seat, which is supported at the rear of the tongue B by means of an arm, W, which is pivoted at opposite ends to the tongue and seat, the upper side of the tongue having serrations, or a rack, X, with which engages a foot, Y, which is pivoted to the seat V, and serves, in connection with the arm W, to support the seat and permit the adjustment of said seat to the height desired or required by the driver, the foot readily engaging with either of the teeth of the rack X, and serving to raise or lower the seat, as is evident.

Z represents a collar, which is secured to the tongue B and embraces the beam A, it being noticed that the inner face of said collar conforms to the angular shape of said beam, and is provided with a set-screw, whereby the beam and tongue are securely connected.

It will be seen that the disks may be adjusted nearer to or farther from each other, and set at various angles with the ground, or raised completely therefrom, so as to limit the number of disks in service, (see dotted lines, Figs. 1 and 2,) it only being necessary to loosen the proper fastening devices, shift the parts laterally on the beam, turn the bars H in the sockets E, or rotate the sleeves D, as the case may be, and again tighten the fastening devices. Again, the disks may be raised or lowered relatively to the desired depth of penetration, and the wheels may also be similarly adjusted, it being seen that flanges $h$ serve as markers, and the broad surfaces of the wheel form the treads on which the implement is run, and prevent improper sinking of the disks into the ground.

It is evident, that owing to the various positions which the disks may assume, the implement may be converted into a harrow, a furrower, a marker, a plow, a cultivator, a corn-plow, a potato-digger, a hiller, a ridger, &c., the same being accomplished by the vertical, lateral, and angular adjustments of the disks and capability of employing one or more disks on each side of the center of the beam A, the remaining disks being out of service without being disconnected from the beam.

The frame N', which supports a marking-wheel, N, or constitutes the bearings for the axis thereof, encircles the wheel from above, and has a central recess in its inner face to receive the flange of said wheel, thus providing a scraper for the wheel, and keeping the same clear of dirt, &c.

Having thus described my invention, what I claim as new, and desire to secure by Letters Patent, is—

1. A supporting-beam, a rotary sleeve, and a socket attached to said sleeve, in combination with a bar which is adjustable vertically in said socket, the latter being adjustable on said sleeve to vary the inclination or angle of said socket, and said sleeve being adjustable laterally on its supporting-beam, substantially as set forth.

2. In an agricultural implement, a rotary disk, in combination with a non-rotating sleeve fitted on a beam adapted to be adjusted laterally, a rotatable sleeve encircling the non-rotatable sleeve, a socket connected with said rotatable sleeve, a non-rotating sleeve fitted within said socket, and the bar of the rotary disk connected with the last-named rotating sleeve, substantially as and for the purpose set forth.

3. In an agricultural implement, a rotary disk and the supporting-bar thereof, of angular form, in combination with the sleeve G, having an angular inner face, and the socket E, the latter being attached to the beam of the implement, substantially as and for the purpose set forth.

4. The sleeve D, with openings $c$ at one end, and the encircled sleeve C, with the fastening F, and the collar $b$, combined and operating substantially as and for the purpose set forth.

5. The bar H, the sleeve G, with openings $e'$, and the encircling socket E, with the fastening L, and the collar $f$, combined and operating substantially as and for the purpose set forth.

FRANKLIN HORST.

Witnesses:
JOHN A. WIEDERSHEIM,
A. P. GRANT.